J. J. MOJONNIER.
ART OF ESTIMATING THE SOLID CONTENT OF LIQUID FOOD PRODUCTS.
APPLICATION FILED NOV. 23, 1914. RENEWED JAN. 31, 1917.
1,221,357.
Patented Apr. 3, 1917.
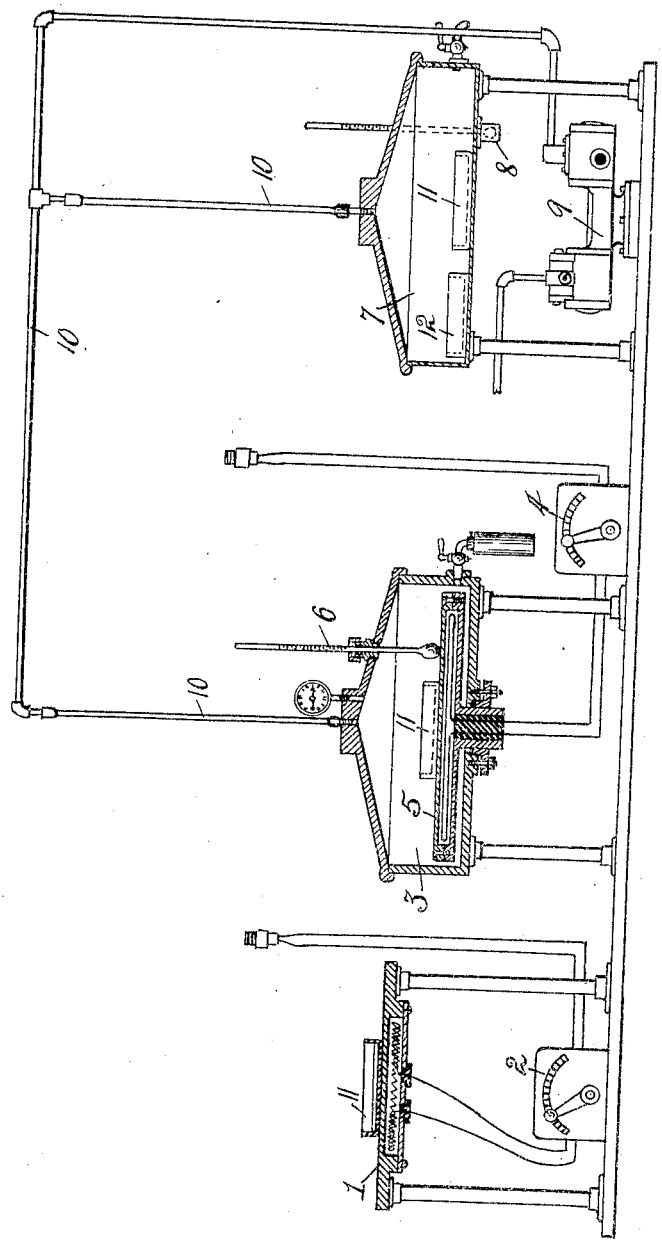
WITNESSES:
D. C. Walter
F. E. Aul
INVENTOR.
Julius J. Mojonnier,
By Burn, Owen & Crampton
His attys

UNITED STATES PATENT OFFICE.

JULIUS JOHN MOJONNIER, OF OAK PARK, ILLINOIS, ASSIGNOR TO MOJONNIER BROS. CO., OF PORTLAND, MAINE, A CORPORATION OF MAINE.

ART OF ESTIMATING THE SOLID CONTENT OF LIQUID FOOD PRODUCTS.

1,221,357.  Specification of Letters Patent.  Patented Apr. 3, 1917.

Application filed November 23, 1914, Serial No. 873,528. Renewed January 31, 1917. Serial No. 145,815.

*To all whom it may concern:*

Be it known that I, JULIUS J. MOJONNIER, a citizen of the United States, and a resident of Oak Park, in the county of Cook and State of Illinois, have invented a certain new and useful Art of Estimating the Solid Content of Liquid Food Products; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

By the gravimetric method heretofore employed for estimating, with absolute precision, the dry matter content of milk, and other liquids of similar characteristics, it has required from two to five hours to complete the determination. It is impractical in factory work to employ such method for the product must of necessity be in cans or other containers before a single determination could be carried through. For this reason some methods have been worked out for shortening this long tedious operation, but it has been found that in all cases, so far as I am aware, a shortening of time in the operation has resulted in inaccurate results, and the conclusion has been repeatedly drawn that no method other than the gravimetric system will yield accurate results.

With milk and liquids of similar characteristics the moisture content has, so far as I am aware, heretofore been determined by evaporating a small sample of milk in a flat bottomed dish, using an oven held at 100° centigrade throughout the operation. Experience proves that by this treatment a hard dry film of milk forms upon the surface of the milk solids, and it requires three or four hours to drive off all of the water in the sample, and even then it is not sure that the moisture is completely out of the sample. It is found that such long exposure to a heat of 100° centigrade tends to char and to oxidize some of the milk solids, and the result of the retention of a part of the moisture and of the charring and oxidation is a false estimation of the water content of the milk, and such a determination is a deception to the consumer, for the milk contains less total solids or food matter than the analysis shows.

The object of my invention is the provision of a method whereby any one skilled in the art can make an absolutely precise determination of the dry matter in any liquid material by the gravimetric system, in a very small fraction of the time heretofore required to obtain the same results, and in a manner which will prevent the formation of the objectionable scum on the sample, particularly in the case of milk.

The invention is fully described in the following specification, and while it is capable of being practised by the use of apparatus of numerous styles, it will be sufficient for an understanding of the invention to illustrate in the accompanying drawing one form only of the apparatus, which is shown in section therein.

Referring to the drawings, 1 designates a heating medium, which, in the present instance, takes the form of a hot-plate that is electrically heated and controlled by a rheostat 2 so that a temperature of 180° to 190° centigrade can be continuously maintained.

3 designates a vacuum oven or desiccator in which a heat of about 100° centigrade is maintained. This oven is preferably, but not necessarily, heated by electricity which is controlled by a rheostat 4, the heating coil being located in a hot-plate 5 within the oven. The temperature of the hot-plate 5 is determined from without the oven by projecting a thermometer 6 through an opening in the oven and placing the mercury bulb thereof in contact with the heating surface of the plate.

Placed a short distance from the vacuum oven 3 is a vacuum cooling chamber 7, which is preferably made of cast brass with its sides and bottom machined very thin and perfectly smooth. The object of this is to form an intimate contact between the oven bottom and the bottom of a dish containing the material being treated. The metal bottom of the cooling chamber conducts the heat away as fast as it is transmitted by the hot dish placed thereon. A small copper cup 8 filled with mercury may be soldered on the bottom of the cooling chamber and a thermometer, which has its mercury bulb placed into this mercury cup, indicates the temperature of dishes in the chamber.

The interior of the oven or desiccator 3 and the cooling chamber 7 have connection with a vacuum pump 9 through a suitable piping 10, whereby a vacuum may be created in each of said oven and cooling chamber.

In practising my improved method, a sample of milk, for instance, is weighed into a previously weighed dish 11, preferably of aluminum, and is distributed evenly over the bottom of the dish in a thin film, as indicated in the dish on the hot-plate 1. The dish is then placed on the hot-plate 1 and heated to about 180° centigrade. The sample boils and bubbles briskly on the hot-plate and in one or two minutes the boiling operation is completed and the surface of the solids in the liquids is broken into numerous small particles that expose a large evaporating surface but still cling together.

When the surface of the solids has thus been broken up, the dish is removed from the hot plate and placed in the vacuum oven 3. Exposure of the sample for about ten minutes to a heat of about 100° centigrade in this oven will yield a perfectly dry residue in the dish. Any moisture rising from the sample is evacuated from the oven through the vacuum pipe 10. When moisture has been entirely evacuated from the sample the dish is removed from the vacuum oven and placed in the vacuum cooling chamber 7, the metal bottom of which quickly conducts the heat away from the hot dish placed thereon. The evacuating system causes the air of the cooling chamber, which is heated by the dish placed therein, to be drawn out, thereby aiding very materially in cooling the dish more rapidly. A flat glass dish 12 containing anhydrous sulfuric acid, placed upon the bottom of the cooling chamber, keeps the inside thereof free from moisture. By using these three physical phenomena—namely, the rapid conduction of heat from the dish by the smooth brass of the cooling chamber, the evacuating of heated air from said chamber, and the eliminating of moisture therefrom by the anhydrous sulfuric acid—the time of cooling is decreased to one-third of the time required in the former method of cooling in a glass cooling chamber. When the temperature of the cooling chamber, as indicated by a thermometer placed in the mercury in the copper cup 8, corresponds to the temperature in the balance scale employed, but not shown, the sample is removed from the cooling chamber and weighed. The cooling operation requires from five to six minutes.

It is evident from the above that with my process the determination is completed in twenty to twenty-five minutes at the most, and also that the impervious film of milk solids that is bound to form on the sample when heated throughout by 100° centigrade, as customarily done, is entirely obviated by reason of the brisk boiling of the sample, which effects a rapid evaporation of the water from the sample and breaks the sample into numerous small particles that expose a large evaporating surface.

It will be understood that the apparatus described and shown illustrates merely one means or apparatus for use in connection with the practising of my improved method, and that the invention is not restricted to use of any particular form of apparatus; and also that while I have specified the degrees of heat preferably employed, such degrees can be changed within a wide range without departing from the invention, and that the heating may be accomplished by electricity or otherwise as desired.

Having thus described my invention, what I claim as new, and desire to secure by Letters Patent, is,—

1. The method of estimating the solids in liquids, which consists in briskly boiling a previously weighed sample of the liquid, then exposing it to an evaporating heat in a vacuum oven until a perfectly dry residue is produced, after which the dish containing the sample is placed in a vacuum cooling chamber and finally weighed.

2. The method of estimating the solids of liquids, which consists in briskly boiling a previously weighed sample of the liquid for a few minutes by a high heat, then exposing the sample to a relatively lower heat until a perfectly dry residue is produced, after which the dish containing the sample is placed in a cooling chamber and finally weighed.

3. The method of estimating the solids in liquids, which consists in briskly boiling a previously weighed sample of the liquid, then exposing it to an evaporating heat in a vacuum oven until a perfectly dry residue is produced, after which the dish containing the sample is placed in a vacuum cooling chamber containing anhydrous sulfuric acid and finally weighed.

4. The method of estimating the solids in liquids, which consits in briskly boiling a previously weighed sample of the liquid, then exposing it to an evaporating heat in a vacuum oven until a perfectly dry residue is produced, after which the dish containing the sample is placed in a vacuum cooling chamber in intimate contact with a part thereof, and finally weighed.

5. The method of estimating the solids in liquids, which consists in subjecting a previously weighed sample of the liquid for a few minutes to a heat of approximately 180° centigrade, then exposing it to an evaporating heat of about 100° centigrade until a perfectly dry residue is produced, after which the dish containing the sample is placed in a cooling chamber and finally weighed.

6. The method of estimating the solids in liquids, which consists in briskly boiling a previously weighed sample of the liquid for a few minutes by a heat of approximately 180° centigrade, then exposing it to an evaporating heat of approximately 100° centigrade in a vacuum oven until a perfectly dry residue is produced, after which the dish containing the sample is placed in a cooling chamber and finally weighed.

7. The method of estimating the solids in liquids, which consists in briskly boiling a previously weighed sample of the liquid for a few minutes by a high heat, then exposing the sample to a lower evaporating heat in a vacuum oven until a perfectly dry residue is produced, after which the dish containing the sample is placed in a cooling chamber in intimate contact with a part thereof and in the presence of a quantity of anhydrous sulfuric acid, the interior of the cooling chamber having connection with a suction force to draw the heated air therefrom, and finally weighing the dish containing the sample.

8. The method of estimating the solids in liquids which consists in briskly boiling a weighed sample of the liquid in a dish by subjecting it to a temperature of approximately 180° centigrade for a few minutes, then placing the dish in a vacuum oven and subjecting it to a heat of approximately 100° centigrade until a perfectly dry residue is yielded, after which the dish is placed in a cooling chamber in intimate contact with a thin smooth part thereof, said cooling chamber having its interior in communication with a suction force to draw the heated air therefrom, and a quantity of anhydrous sulfuric acid being placed in the cooling chamber with the sample, and finally weighing the dish containing the sample.

9. The method of determining the solid content of a liquid, consisting in subjecting a known quantity of the liquid in a thin film to the action of heat sufficient to cause the same to boil briskly, driving off the moisture therein.

10. The method of estimating the solid content of a liquid, consisting in subjecting a known quantity of the liquid in a thin film to heat sufficient to cause the film of liquid to boil briskly, thereby evaporating the liquid, completely drying the residue thus obtained, and finally comparing the quantity of the residue to the original quantity of liquid.

11. The method of estimating the solid content of a liquid, consisting in subjecting a known quantity of the liquid to the action of heat sufficient to cause the same to boil briskly, thereby evaporating the liquid, completely drying the residue thus obtained, cooling said residue by providing a large heat radiation surface therefor, and finally comparing the quantity of the residue to the original quantity of the liquid.

12. The method of determining the solid content of a liquid, consisting in subjecting a known quantity of the liquid to the action of heat sufficient to cause the same to boil briskly, thereby driving off the moisture therein, cooling the residue thus obtained by providing a comparatively large heat radiating surface therefor, and finally comparing the quantity or residue to the original quantity of the liquid.

13. The method of determining the solid content of a liquid consisting in subjecting a known quantity thereof to heat thereby driving off the moisture therein sufficient to boil it, and comparing the quantity of the residue thus obtained to the initial known quantity of the liquid.

14. The method of determining the solid content of a liquid, consisting in subjecting a known quantity thereof in a thin film to action of heat sufficient to briskly boil the same simultaneously breaking the surface thereof and driving off the moisture therein, and comparing the quantity of the residue so obtained to the initial known quantity of the liquid.

In testimony whereof I have hereunto signed my name to this specification in the presence of two subscribing witnesses.

JULIUS JOHN MOJONNIER.

Witnesses:
 TIMOTHY MOJONNIER,
 EDWARD CASLER.